J. M. ASKIN.
ELECTRODE.
APPLICATION FILED DEC. 5, 1919.
1,393,483.
Patented Oct. 11, 1921.
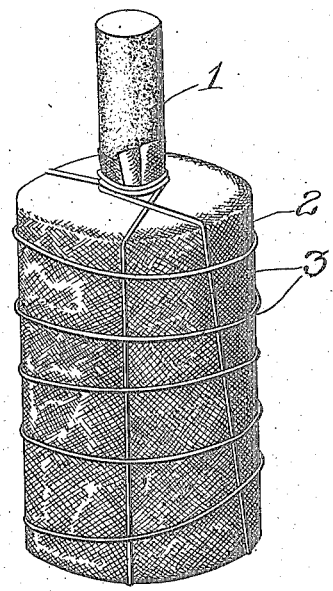
Inventor:
Joseph M. Askin,

UNITED STATES PATENT OFFICE.

JOSEPH M. ASKIN, OF CHICAGO, ILLINOIS, ASSIGNOR TO STUART PRODUCTS CORPORATION, OF CHICAGO, ILLINOIS, A CORPORATION OF ILLINOIS.

ELECTRODE.

1,393,483.

Specification of Letters Patent.     Patented Oct. 11, 1921.

Application filed December 5, 1919. Serial No. 342,818.

*To all whom it may concern:*

Be it known that I, JOSEPH M. ASKIN, a citizen of Russia, residing at Chicago, in the county of Cook and State of Illinois, have invented a new and useful Improvement in Electrodes, of which the following is a specification.

My invention relates more particularly to electrodes of the so-called bobbin type and involving a core, generally of carbon in the form of a stick, and a mixture of ingredients forming a depolarizing mixture, surrounding the core and of such character as to render desirable the inclosing of this mixture in an envelop pervious to moisture.

The depolarizing mixtures used commonly comprise solid particles in pulverized or granulated form, an instance of such mixture being that formed of graphite, manganese and chlorid of zinc solution. As these bobbin electrodes have been commonly provided they present the objection of permitting particles of the depolarizing mixture, in the action of the battery in which the electrode is used as an element, to work through the interstices in the envelop of the bobbin, oftentimes penetrating the electrolyte and contacting with the zinc receptacle of the battery, with the result of producing local short-circuiting, with the manifest disadvantage.

My object is to provide a bobbin electrode of such construction that while its surrounding envelop, in which the depolarizing material is confined, is sufficiently pervious to moisture to permit of the proper action of the elements of the battery, it will not permit of the escape therefrom of the solid particles of the depolarizing material, thereby avoiding the impairment of the cell from this cause, as by local short-circuiting.

In the accompanying drawing I have shown a bobbin electrode in which my invention is embodied, wherein the core thereof and which may be of stick carbon, is represented at 1, this core being surrounded at one end by a mass of depolarizing material (not shown) and which is contained within the envelop shown at 2. The depolarizing material within the envelop 2, may be any suitable material, as for example a mixture of the ingredients as hereinbefore stated.

The envelop 2 is of any suitable material having the property of permitting of the permeating of moisture therethrough sufficiently to render the elements of the cell active, but not permit of the escape therefrom of solid particles of the depolarizing material, a desirable material for this purpose being what is commonly known among chemists as filtering paper which is provided in sheets and is shaped and folded about the mass of depolarizing material preferably after molding the depolarizing material about the core 1, to envelop it as shown, this envelop being secured in position in any suitable way, as for example by wrapping and tying cord, represented at 3, about it.

By constructing a battery in accordance with my invention one of the conditions commonly existing in batteries as hitherto provided and constituting one of the most important factors in the deterioration of the battery, is eliminated.

What I claim as new and desire to secure by Letters Patent is:

1. An electrode for a battery comprising a carbon core, depolarizing material surrounding said core and an envelop surrounding said depolarizing material, said envelop being of a material presenting relatively low resistance to the flow of current therethrough and having the property of permitting moisture to pass therethrough for rendering the same active, but preventing the escape therethrough of solid particles of the depolarizing material.

2. An electrode for a battery comprising a carbon core, depolarizing material surrounding said core, and an envelop formed of vegetable fiber paper surrounding said depolarizing material.

3. An electrode for a battery comprising a carbon core, depolarizing material surrounding said core, and an envelop formed of vegetable fiber filtering paper surrounding said depolarizing material.

4. An electrode comprising a carbon core, depolarizing material surrounding said core, and an envelop surrounding said depolarizing material, said envelop being in the form of a sheet presenting relatively low resistance to the flow of current therethrough and wrapped and folded about the depolarizing material and held in place thereon and having the property of permitting moisture to pass therethrough for rendering the same active, but preventing the escape therethrough of solid particles of the depolarizing material.

5. An electrode for a battery formed separate from the other parts of the battery and comprising a carbon core, depolarizing material surrounding said core and an envelop surrounding said depolarizing material, said envelop being of a material presenting relatively low resistance to the flow of current therethrough and having the property of permitting moisture to pass therethrough for rendering the same active, but preventing the escape therethrough of solid particles of the depolarizing material.

6. An electrode for a battery formed separate from the other parts of the battery, comprising a carbon core, depolarizing material surrounding said core, and an envelop formed of vegetable fiber paper surrounding said depolarizing material.

7. An electrode for a battery formed separate from the other parts of the battery, comprising a carbon core, depolarizing material surrounding said core, and an envelop formed of vegetable fiber filtering paper surrounding said depolarizing material.

8. An electrode for a battery formed separate from the other parts of the battery and comprising a carbon core, depolarizing material surrounding said core, and an envelop surrounding said depolarizing material, said envelop being in the form of a sheet presenting relatively low resistance to the flow of current therethrough and wrapped and folded about the depolarizing material and held in place thereon and having the property of permitting moisture to pass therethrough for rendering the same active, but preventing the escape therethrough of solid particles of the depolarizing material.

JOSEPH M. ASKIN.